(12) United States Patent
Keränen et al.

(10) Patent No.: US 12,481,023 B2
(45) Date of Patent: Nov. 25, 2025

(54) ANTENNA FOR A RADAR APPARATUS

(71) Applicant: Vaisala Oyj, Helsinki (FI)

(72) Inventors: Reino Keränen, Espoo (FI); Markus Berg, Kiiminki (FI); Tommi Tuovinen, Tyrnävä (FI)

(73) Assignee: Vaisala Oyj, Helsinki (FI)

( * ) Notice: Subject to any disclaimer, the term of this patent is extended or adjusted under 35 U.S.C. 154(b) by 332 days.

(21) Appl. No.: 18/179,991

(22) Filed: Mar. 7, 2023

(65) Prior Publication Data

US 2023/0288535 A1    Sep. 14, 2023

(30) Foreign Application Priority Data

Mar. 9, 2022    (EP) .................................... 22161061

(51) Int. Cl.
 *G01S 7/41*    (2006.01)
 *G01S 7/35*    (2006.01)
 (Continued)

(52) U.S. Cl.
 CPC ................ *G01S 7/41* (2013.01); *G01S 7/352* (2013.01); *G01S 13/42* (2013.01); *G01S 13/583* (2013.01);
 (Continued)

(58) Field of Classification Search
 CPC . G01S 7/41; G01S 7/352; G01S 13/42; G01S 13/583; G01S 13/95; H01Q 19/06; H01Q 19/10
 (Continued)

(56) References Cited

U.S. PATENT DOCUMENTS 2,716,746 A * 8/1955 Howery ............... H01Q 25/002
 343/753
3,775,769 A * 11/1973 Heeren ..................... H01Q 3/46
 343/754
(Continued)

FOREIGN PATENT DOCUMENTS

EP      0124173 B1 *  8/1988  ............. G01S 13/42
EP      0947852 A1 * 10/1999  ............. G01S 13/42
(Continued)

OTHER PUBLICATIONS

Saunders William K.: "CW and FM Radar", In: "Radar Handbook", Jan. 1, 1990 (Jan. 1, 1990), McGraw-Hill, New York [u.a.] 024245, XP093060665, ISBN: 978-0-07-057913-2, pp. 14.1-14.45.
(Continued)

*Primary Examiner* — Nuzhat Pervin
(74) *Attorney, Agent, or Firm* — MASCHOFF BRENNAN; Paul G. Johnson

(57) ABSTRACT

According to an example embodiment, an antenna assembly for a radar apparatus is provided, the antenna assembly comprising: a feed antenna arranged to radiate outbound radio waves that represent a transmitted RF signal supplied thereto and capture a received RF signal that represents inbound radio waves received thereat; and a focusing element arranged to collimate the outbound radio waves into a transmitter beam for transmission towards a monitoring direction and focus inbound radio waves of a receiver beam received at the focusing element from the monitoring direction for reception at the feed antenna, wherein the arrangement of the feed antenna and the focusing element is configured to transmit the transmitter beam as a sequence of substantially concave radio waves and receive the receiver beam as a sequence of substantially convex radio waves.

10 Claims, 5 Drawing Sheets

(51) Int. Cl.
  *G01S 13/42* (2006.01)
  *G01S 13/58* (2006.01)
  *G01S 13/95* (2006.01)
  *H01Q 19/06* (2006.01)
  *H01Q 19/10* (2006.01)
(52) U.S. Cl.
  CPC .............. *G01S 13/95* (2013.01); *H01Q 19/06* (2013.01); *H01Q 19/10* (2013.01)
(58) Field of Classification Search
  USPC ........................................................ 342/26 R
  See application file for complete search history.

(56) References Cited

U.S. PATENT DOCUMENTS

| | | | | |
|---|---|---|---|---|
| 5,652,589 | A * | 7/1997 | Ono | G01S 13/345 |
| | | | | 342/79 |
| 6,441,793 | B1 * | 8/2002 | Shea | H01Q 5/45 |
| | | | | 343/753 |
| 7,663,546 | B1 * | 2/2010 | Miyamoto | H01Q 3/2652 |
| | | | | 342/370 |
| 8,478,344 | B2 * | 7/2013 | Rofougaran | H01L 25/0655 |
| | | | | 307/130 |
| 8,588,805 | B2 * | 11/2013 | Grau Besoli | H04B 7/084 |
| | | | | 455/562.1 |
| 8,600,442 | B2 * | 12/2013 | Rofougaran | H01L 24/49 |
| | | | | 330/7 |
| 8,700,357 | B2 * | 4/2014 | Fehrenbach | G01F 23/28 |
| | | | | 702/55 |
| 8,836,574 | B2 * | 9/2014 | Grau Besoli | H01Q 3/30 |
| | | | | 342/165 |
| 9,373,896 | B2 * | 6/2016 | Runyon | H01Q 3/30 |
| 9,793,963 | B2 * | 10/2017 | Grau Besoli | H04B 7/0404 |
| 11,662,455 | B2 * | 5/2023 | Bharadwaj | G01S 13/583 |
| | | | | 342/128 |
| 11,670,866 | B2 * | 6/2023 | Kishigami | G01S 13/42 |
| | | | | 342/118 |
| 11,686,825 | B2 * | 6/2023 | Qiu | G01S 7/4813 |
| | | | | 356/5.01 |
| 11,750,303 | B2 * | 9/2023 | Vanwiggeren | H04B 17/102 |
| | | | | 455/67.12 |
| 2005/0206556 | A1 * | 9/2005 | Isaji | G01S 13/4454 |
| | | | | 342/107 |
| 2009/0102740 | A1 * | 4/2009 | Rofougaran | H01Q 23/00 |
| | | | | 343/860 |
| 2009/0153395 | A1 * | 6/2009 | Morinaga | G01S 5/04 |
| | | | | 342/175 |
| 2010/0151810 | A1 * | 6/2010 | Grau Besoli | H04B 17/104 |
| | | | | 455/311 |
| 2012/0112953 | A1 * | 5/2012 | Grau Besoli | G01S 13/87 |
| | | | | 342/146 |
| 2013/0260708 | A1 * | 10/2013 | Rofougaran | H01L 24/49 |
| | | | | 455/280 |
| 2013/0285848 | A1 * | 10/2013 | Grau Besoli | H01Q 3/40 |
| | | | | 342/134 |
| 2014/0247181 | A1 * | 9/2014 | Nogueira-Nine | G01S 13/343 |
| | | | | 342/128 |
| 2015/0029065 | A1 * | 1/2015 | Cheng | H01Q 19/06 |
| | | | | 343/753 |
| 2015/0084810 | A1 * | 3/2015 | Lee | G01S 13/4463 |
| | | | | 342/154 |
| 2015/0130655 | A1 * | 5/2015 | Aizawa | G01S 13/42 |
| | | | | 342/147 |
| 2015/0145714 | A1 * | 5/2015 | Watanabe | G01S 13/38 |
| | | | | 342/107 |
| 2015/0148098 | A1 * | 5/2015 | Grau Besoli | H01Q 21/293 |
| | | | | 455/553.1 |
| 2017/0261610 | A1 * | 9/2017 | Scally | G01S 15/50 |
| 2018/0164430 | A1 * | 6/2018 | Kuriyama | G01S 13/93 |
| 2020/0166613 | A1 * | 5/2020 | Hall | G01S 7/4865 |
| 2021/0013747 | A1 * | 1/2021 | Wang | H02J 50/80 |
| 2021/0364608 | A1 * | 11/2021 | Xiang | G01S 7/4817 |
| 2022/0021125 | A1 * | 1/2022 | Baligh | H01Q 21/06 |
| 2022/0026544 | A1 * | 1/2022 | Wu | G01S 17/08 |
| 2022/0057504 | A1 * | 2/2022 | Maekawa | G01S 13/32 |
| 2022/0082426 | A1 * | 3/2022 | Wälde | G01S 7/032 |
| 2022/0368033 | A1 * | 11/2022 | Fillion | H01Q 15/10 |
| 2024/0393658 | A1 * | 11/2024 | Kato | G02B 26/06 |

FOREIGN PATENT DOCUMENTS

| | | | | |
|---|---|---|---|---|
| EP | 0985938 | A1 * | 3/2000 | ............ G01S 13/48 |
| EP | 2824477 | A1 * | 1/2015 | ............ H01Q 25/00 |
| EP | 2519833 | B1 * | 8/2015 | ........... G01S 13/878 |
| EP | 4130793 | A1 * | 2/2023 | ........... G01S 13/931 |
| JP | 2010002350 | A | 1/2010 | |

OTHER PUBLICATIONS

Summons to attend oral proceedings pursuant to Rule 115(1) EPC mailed Jul. 14, 2023, in related European Patent Application No. 22 161 061.1, 10 pgs.

Gandini, Erio et al: "Optomechanical System Design for Dual-Mode Stand-Off Submillimeter Wavelength Imagers", IEEE Transactions of Terahertz Science and Technology, IEEE, Piscataway, NJ, USA, vol. 7, No. 4, Jul. 1, 2017, pp. 393-403.

Jinghui, Qiu et al: "Design and Measurement of Quasi-Optics for Millimeter Wave Imaging System", Imaging Systems and Techniques, 2009. 1st '09. IEEE International Workshop on, IEEE, Piscataway, NJ, USA, May 11, 2009, pp. 132-135.

Kildal, P.-S. et al: "Characterisation of near-field focusing with application to low altitude beam focusing of the Arecibo tri-reflector system", IEEE Proceedings: Microwaves, Antennas and Propagation, IEEE, Stevenage, Herts, GB, vol. 143, No. 4, Aug. 13, 1996, pp. 284-292.

Olver, A.D. et al: "Variable Beamwidth Reflector Antenna By Feed Defocusing", IEEE Proceedings: Microwaves, Antennas and Propagation, IEEE, Stevenage, Herts, GB, vol. 142, No. 5, Oct. 1, 1995, pp. 394-398.

Rappaport, Carey M. et al: "The Bifocal Microwave Microscope", 2019 IEEE International Symposium on Antennas and Propagation and USNC-URSI Radio Science Meeting, Jul. 7, 2019, pp. 475-476.

European Office Action, as issued in connection with European Application No. 22 161 061.1, dated Feb. 22, 2023, 7 pgs.

* cited by examiner

ANTENNA FOR A RADAR APPARATUS

TECHNICAL FIELD

The example and non-limiting embodiments of the present invention relate to an antenna assembly for a radar apparatus and/or to a radar apparatus employing the antenna assembly.

BACKGROUND

In general, a radar is a detection system that applies radio frequency (RF) waves for detecting targets at distant locations via using a transmitter to transmit radio waves, a receiver to receive reflections of the transmitted radio waves from remote targets, and a processing system for determining characteristics of the remote targets (such as their locations and velocities) based on the received radio waves. The radio waves reflected from the remote targets may be also referred to as backscattered radio waves or as backscattered RF signal. Radars find use in a wide range of different applications, including monitoring location and movement of distinct objects such as road vehicles, aircrafts, marine vessels as well as observing evolution of atmospheric and meteorological parameters.

Typically, a radar intended e.g. for atmospheric and/or meteorological applications aims at observing a plurality of relatively small targets at relatively long distances from the radar and, subsequently, estimating their characteristics in an accurate and reliable manner. Herein, the characteristics of targets under consideration may include their respective shapes and sizes, their respective distances from the radar, and their respective movement with respect to the radar. Moreover, the radar may aim at estimating such target characteristics for large quantities of targets distributed in the atmosphere at distances that may extend from a few meters e.g. up to a few hundred kilometers.

As an example of such a radar design, FIG. 1A illustrates a block diagram of some components of a radar apparatus while also schematically illustrating some aspects of operation of the radar apparatus. The radar apparatus of FIG. 1A includes an antenna assembly 10 comprising a feed antenna 11 and a lens element 12 (or another focusing element), where the lens element 12 serves to collimate radio waves transmitted (TX) from the feed antenna 11 into a RF beam 13 transmitted from the antenna assembly 10 and to focus radio waves received (RX) at the antenna assembly 10 to the feed antenna 11. The feed antenna 11 is coupled to a transmitter 20 for supplying a RF signal for transmission as the radio waves via the feed antenna 11 and to a receiver 30 for receiving a RF signal from the feed antenna 11. The transmitter 20 and the receiver 30 are coupled to a processing unit 50 arranged for controlling respective operation of the transmitter 20 and the receiver 30 and for deriving characteristics of detected targets based on the transmitted and received RF signals.

The lens element 12 is arranged to collimate the radio waves originating from the feed antenna 11 as respective plane waves, the RF beam 13 transmitted from the antenna assembly 10 hence propagating as a sequence of plane waves 13a. When meeting a target 40 at a distance from the antenna assembly 10, the series of plane waves 13a results in a corresponding series of backscattered (or reflected, echoed) waves 43a that have a substantially spherical shape. However, despite their substantially spherical overall shape, at relatively long distances between the antenna 10 and the target 40, respective portions of the spherical backscattered waves 43a that meet the lens element 12 substantially approximate a plane wave (due to small solid angle of a front end of the lens element 12 in view of the target 40). In this regard, a portion of the front end of the lens element 12 that is available for transmission and reception of radio waves may be referred to as a (mechanical) antenna aperture, whereas a portion of the (mechanical) antenna aperture that is actually applied for transmission and reception of the radio waves may be referred to as an effective antenna aperture. The size of the (mechanical) antenna aperture and the effective antenna aperture may be defined, for example, via the diameter of its projection (e.g. its cross-section).

Consequently, for a target 40 that is relatively far away from the antenna 10, the backscattered waves 43a echoed back from the target 40 and captured in the received RF signal add up constructively at the receiver 30 and, subsequently, the processing unit 50 may match waveforms conveyed in the received RF signal with waveforms of the transmitted RF signal for the purpose of resolving the range (i.e. the distance) of the target 40 and the amplitude and phase of the backscattering process, thereby enabling the processing unit 50 to determine characteristics of the target 40 in an accurate manner. Hence, the above-described antenna assembly 10 is suitable for observing targets 40 that are relatively far away from the antenna assembly 10, i.e. targets that reside in a far field. In contrast, targets that reside relatively close to the antenna assembly 10 may be considered ones residing in a near field. In this regard, the Fraunhofer limit RF of the antenna assembly 10 derived as $$R_F = 2d^2/\lambda,$$

where d denotes the diameter of the (mechanical) antenna aperture and λ denotes carrier wavelength applied by the feed antenna 11, is typically considered as a boundary between the near field and the far field. In this regard, a range of distances that are closer to the antenna assembly 10 than the Fraunhofer limit RF may be referred to as the Fresnel zone.

While the performance of a radar making use of the antenna assembly 10 is tuned for reliable and accurate operation in the far field, its performance in the near field (e.g. in the Fresnel zone) is typically compromised at least to some extent. As an example in this regard, FIG. 1B illustrates a block diagram showing some components of the radar apparatus already shown in FIG. 1A (while some elements are omitted for improved graphical clarity) together with schematically illustrating some aspects of operation of the radar apparatus for the target 40 residing in the near field. In particular, in case the target 40 resides relatively close to the antenna assembly 10, the respective portions of the spherical backscattered waves 43a from the target 40 that meet the antenna aperture still exhibit significant curvature. Due to this deviation from the plane wave, the backscattered waves 43a do not add up constructively at the receiver 30, which may lead to losses in received signal power and to distortions in its phase pattern. Consequently, accuracy and reliability of measured characteristics of the target 40 may be compromised, the target 40 may be missed altogether, or anomalous spectral features of the received RF signal may be mistaken as a target that does not actually exist.

In all radar applications, a sufficiently high signal power with respect to omnipresent background noise is required for reliable detection and accurate measurements. This requirement of a relatively high signal-to-noise power ratio (SNR) becomes imperative when observing targets such as small atmospheric constituents for which the backscattered signals are diminished radically as function of their size. As known in the art, the power of backscattered signal increases rapidly with decreasing distance to the target, which suggests that measurements within the near field (e.g. within the Fresnel zone) may provide a straightforward means for improved SNR, whereas other alternatives in this regard, include application of increased transmitter power (which is typically a costly approach for improving performance) and/or improved receiver design performance (which is typically already relatively close to elementary natural limits).

A specific challenge arises in spectral resolution (or fidelity) in simultaneous detection and measurement of a plurality of targets: When considering echo from far ranges, the size of the resolvable measurement volume becomes large, dictated by continuously growing transverse size of the transmitted RF beam 13 as well as by technical limitations in reducing the range resolution. Consequently, far field radar echo consists of contributions from targets which tend to have increasingly different characteristics due to their wide spatial distributions. This leads to the known phenomenon of spectral broadening, which typically deteriorates quality of measurements in an irreversible manner.

SUMMARY

It is an object of the present invention to provide an antenna assembly for a radar apparatus to facilitate detecting and distinguishing a plurality of targets of various sizes at various distances from the antenna assembly to enable deriving one or more characteristics of the detected targets at a high resolution and accuracy, whereas it is a further object of the present invention to provide a radar apparatus making use of such an antenna assembly to derive the one or more characteristics of a plurality of targets of various sizes at various distances from the antenna assembly at a high resolution and accuracy.

According to an example embodiment, an antenna assembly for a radar apparatus is provided, the antenna assembly comprising: a feed antenna arranged to radiate outbound radio waves that represent a transmitted RF signal supplied thereto and capture a received RF signal that represents inbound radio waves received thereat; and a focusing element arranged to collimate the outbound radio waves into a transmitter beam for transmission towards a monitoring direction and focus inbound radio waves of a receiver beam received at the focusing element from the monitoring direction for reception at the feed antenna, wherein the arrangement of the feed antenna and the focusing element is configured to transmit the transmitter beam as a sequence of substantially concave radio waves and receive the receiver beam as a sequence of substantially convex radio waves.

According to another example embodiment, a radar apparatus is provided, the radar apparatus comprising an antenna assembly according to the example embodiment described in the foregoing and a transmitter arranged to supply the transmitted RF signal to the feed antenna and a receiver arranged to receive the received RF signal captured at the feed antenna; and a processing unit (150) arranged to determine, based on the received RF signal in consideration of the transmitted RF signal, respective characteristics of one or more targets (40) at distance from the antenna assembly (110) in the monitoring direction, wherein said characteristics include at least one of the following: respective locations of the one or more targets, respective velocities of the one or more targets, respective sizes of the one or more targets, respective shapes of the one or more targets.

According to another example embodiment, a method is provided, the method comprising providing an antenna assembly that comprises: a feed antenna arranged to radiate outbound radio waves that represent a transmitted RF signal supplied thereto and capture a received RF signal that represents inbound radio waves received thereat; and a focusing element arranged to collimate the outbound radio waves into a transmitter beam for transmission towards a monitoring direction and focus inbound radio waves of a receiver beam received at the focusing element from the monitoring direction for reception at the feed antenna, wherein the method comprises operating the antenna assembly to transmit the transmitter beam as a sequence of substantially concave waves and to receive the receiver beam as a sequence of substantially convex radio waves.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings, where.

DESCRIPTION OF SOME EMBODIMENTS

Figure 2:
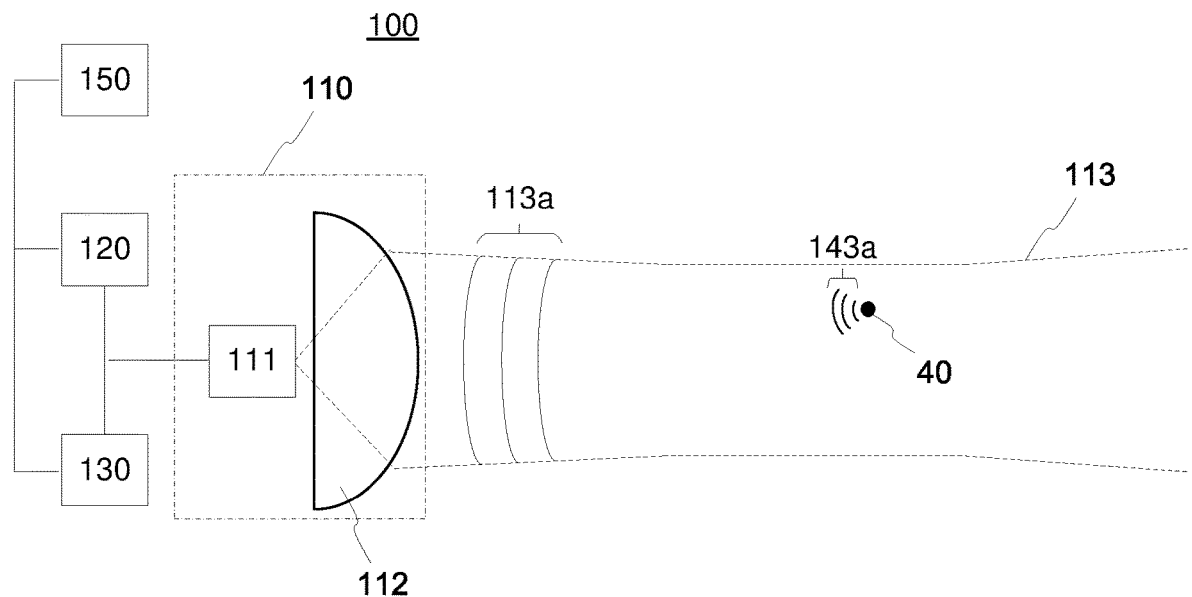
FIG. 2 illustrates a block diagram of some components of a radar apparatus together with a block diagram of some components of the radar apparatus according to an example.

FIG. 2 illustrates a radar apparatus 100 according to an example, including a schematic illustration of some components of an antenna assembly 110 together with a block diagram of some (other) components of the radar apparatus 100. The radar apparatus 100 is shown in the example of FIG. 2 with the antenna assembly 110, a transmitter 120, a receiver 130, and a processing unit 150. The radar apparatus 100 may be employed for applications where simultaneous detection and tracking of a plurality of targets is required, such as for meteorological and/or atmospheric studies. In this regard, FIG. 2 provides a simplified illustration of the radar apparatus 100, showing only components that are necessary for describing operation and various advantageous characteristics of the radar apparatus 100 and/or antenna assembly 110 according to the present disclosure, whereas a radar apparatus 100 and/or the antenna assembly 110 may include one or more components not included in the illustration of FIG. 2 without departing from the scope of the present disclosure.

The antenna assembly 110 comprises a feed antenna 111 and a focusing element 112, where the feed antenna 111 may be arranged to transmit outbound radio waves that represent a transmitted RF signal and where the focusing element 112 may be arranged to collimate or converge the outbound radio waves originating from the feed antenna 111 into a transmitter beam 113. The focusing element 112 may be further arranged to focus inbound radio waves of a receiver beam arriving at the focusing element 112 (from the opposite direction) for reception at the feed antenna 111 to enable capturing a received RF signal therein. In the course of its operation, the radar apparatus 100 is positioned such that the transmitter beam 113 emitted from the antenna assembly 110 is directed to a monitoring direction of interest, whereas radio waves echoed (or reflected, backscattered) from one or more targets in the monitoring direction are received at the antenna assembly 110 in the receiver beam and captured in the received RF signal that is descriptive of respective characteristics of the one or more targets.

Hence, the feed antenna 111 comprises an antenna arrangement that is applicable both for transmitting the outbound radio waves and for receiving the inbound radio waves. As an example in this regard, the antenna arrangement may comprise a single antenna element that is applied for transmitting the outbound radio waves and for receiving the inbound radio waves, whereas in another example the antenna arrangement may comprise a first antenna element for transmitting the outbound radio waves and a second antenna element for receiving the inbound radio waves.

The feed antenna 111 may be coupled to the transmitter 120 and to the receiver 130. While the transmitter 120 and the receiver 130 are respective separate logical entities, an entity comprising the transmitter 120 and the receiver 130 may be referred to as a transceiver. The transmitter 120 may provide the (to be) transmitted RF signal to the feed antenna 111, whereas the receiver 130 may obtain the received RF signal from the feed antenna 111. each of the transmitter 120 and the receiver 130 may be coupled to the processing unit 150, which may be arranged to control respective operation of the transmitter 120 and the receiver 130. The processing unit 150 may be further arranged to implement one or more RF processing steps such as conversions between a baseband and the applied carrier frequency and to derive one or more characteristics of the one or more targets based on the received RF signal in view of the transmitted RF signal. In this regard, the processing unit 150 may apply signal processing techniques known in the art and commonly applied for processing of radar signals to derive e.g. respective one or more characteristics of the one or more targets based on the received RF signal, e.g. based on spectral characteristics of the received RF signal, in consideration of the transmitted RF signal. Herein, the one or more characteristics derived for each of the one or more targets may include one or more of the following:

position of the respective target,
size of the respective target,
shape of the respective target, and
motion (e.g. velocity) of the respective target.

Hence, in an example, the radar apparatus 100 may enable simultaneously detecting and distinguishing a plurality of targets at remote locations and deriving their respective positions, velocities and one or more other characteristics (such as their shapes and/or sizes) across a wide range of distances from the radar apparatus 100. Various aspects of structure and operation of the antenna assembly 110 that enables such radar performance, also in case of target(s) that reside within the near field (e.g. within the Fresnel zone), are described in the non-limiting examples provided in the following.

The focusing element 112 in the meaning of the present disclosure may comprise any element that is capable of collimating (or converging) the outbound radio waves into the transmitter beam 113 and focusing the inbound radio waves of the receiver beam for reception at the feed antenna 111. Examples of such focusing elements include the following:

a lens element made of dielectric material that is transparent or substantially transparent to the outbound and inbound radio waves at wavelengths applied by the transmitter 120 and the receiver 130 and that serves to refract the outbound and inbound radio waves in a desired manner;

a reflector element for reflecting (e.g. collimating or converging) outbound radio waves into the RF beam 113 and for reflecting (e.g. focusing) the inbound radio waves for reception at the feed antenna 111 in a desired manner, such as a parabolic reflector.

The focusing element 112 may be positioned with respect to the feed antenna 111 such that it serves to collimate the outbound radio waves into the transmitter beam 113 and to focus the inbound radio waves of the receiver beam for reception at the feed antenna 111. In particular, the focusing element 112 may be arranged to collimate the outbound radio waves originating from the feed antenna 111 into respective concave waves of the transmitter beam 113 and to focus convex inbound radio waves of the receiver beam backscattered (or reflected, echoed) from one or more targets for reception at the feed antenna 111. In other words, the antenna assembly 110 may be arranged to emit a sequence of outbound radio waves that exhibit a concave phase pattern and to receive a sequence of inbound radio waves that exhibit a convex phase pattern. Consequently, the outbound radio waves of the transmitter beam 113 may propagate as a sequence of concave transmitted waves 113a whereas the inbound radio waves of the receiver beam may propagate as a sequence of convex received waves.

When meeting a target 40 at a distance from the antenna assembly 110, the series of concave waves 113a results in a corresponding series of backscattered (or reflected, echoed) waves 143a that have a substantially spherical overall shape, which in the antenna assembly 110 point of view constitutes a convex shape. Especially in cases where the target 40 resides in the near field, the respective portions of the spherical backscattered waves 143a that meet the (relatively large) antenna aperture still exhibit curvature to an extent that substantially matches the respective shapes of the concave transmitted waves 113a. Therefore, the backscattered convex waves 143a captured in the received RF signal add up constructively at the receiver 130, and the processing unit 150 may match the waveforms captured in the received RF with the waveforms of the transmitted RF signal in order to define position of the target 40 as well as the amplitude and phase of the backscattering process, thereby enabling accurate and reliable determination of various characteristics of the target 40 also in the near field.

As an example, the near field where the radar apparatus 100 provides a significant improvement in detecting and distinguishing targets in comparison to previously known solutions may be considered to cover a range of distances that are within the Fresnel zone, i.e. a range of distances that are within (e.g. closer than) the Fraunhofer limit RF from the antenna assembly 110. Moreover, the improved performance may also extend to at least a portion of the far field, whereas the performance at longer distances from the antenna assembly 110 may be substantially similar to that provided by previously known approach outlined in the foregoing with references to FIGS. 1A and 1B.

In various examples, the exact shape and/or the extent of curvature of the concave waves 113a of the transmitter beam 113 transmitted from the antenna assembly 110 may depend, for example, on respective characteristics of the feed antenna 111, the focusing element 112 and/or the transmitted RF signal as well as on positioning of the feed antenna 111 with respect to the focusing element 112. As non-limiting examples in this regard, the concave waves 113a may have a spherical shape or an ellipsoidal shape, whereas in other examples the concave waves 113a may exhibit a concave shape that does not substantially follow any specific geometrical shape.

Regardless of their exact shape, as described in the foregoing, the concave waves 113a of the transmitter beam 113 may be applied to provide an improvement in a capability to detect and distinguish targets in the near field (e.g. in the Fresnel zone) while maintaining good performance also in the far field. The extent of curvature of the concave waves 113a may have an effect on the optimal operating range of the radar apparatus 100 and/or the antenna assembly 110: as a general rule, applying a more pronounced curvature may be applied to steer the optimal operating range towards shorter distances from the antenna assembly 110, whereas applying a less pronounced curvature may be applied to steer the optimal operating range towards longer distances. Conversely, the most suitable operating range of the radar apparatus 100 may depend on the extent curvature applied for the concave waves emitted from the antenna assembly 110. In this regard, in some examples the radar apparatus 100 may be primarily designed for carrying out measurements in a limited measurement range, e.g. within a range that covers only the near field or a portion thereof or within a range that covers the near field (or portion thereof) together with a portion of the far field that is immediately adjacent to the near field. In such a design, the antenna assembly 110 may be arranged to emit concave waves 113a of relatively high extent of curvature to optimize the detection performance in the near field. In other examples, the radar apparatus 100 may be designed for carrying out measurements both in the near field and in the far field and, consequently, the antenna assembly 110 may be arranged to emit concave waves 113a of relatively low extent of curvature to ensure good detection performance both in the near field and in the far field.

Figure 3A:
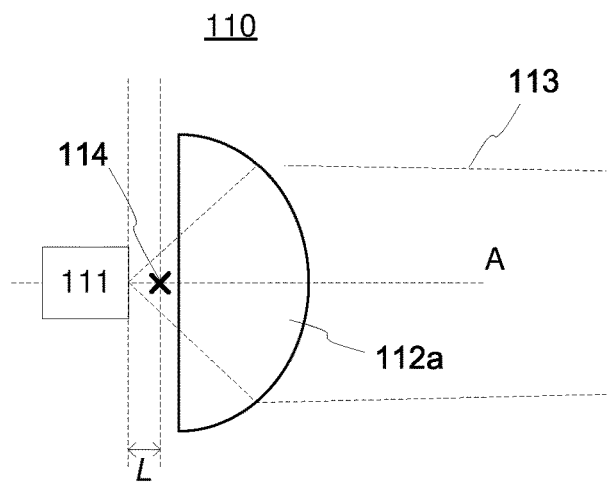
FIG. 3A schematically illustrates some aspects of an antenna assembly according to example.

FIG. 3A schematically illustrates a cross-sectional view to some elements of the antenna assembly 110 according to an example, where the focusing element 112 comprises a lens element 112a that serves as a converging lens. In this regard, the lens element 112a may comprise a suitably shaped piece of dielectric material that is transparent or substantially transparent to the outbound radio waves transmitted from the feed antenna 111 and to inbound radio waves received at the feed antenna 111 at wavelengths applied by the transmitter 120 and the receiver 130. As an example in this regard, the lens element 112a may have a substantially circular cross-section with a convex front end, where the surface of the front end may have a substantially ellipsoidal shape, the front end of the lens element 112a thereby following or approximating a surface of a truncated prolate spheroid or a surface of a truncated oblate spheroid. In a non-limiting example, the lens element 112a may be made of polyethylene (PE), such as high-density polyethylene (HDPE). In another example, the lens element 112a may be made of cross-linked polystyrene, whereas in further examples the lens element 112a may be made of a material such as nylon, boron nitride or quartz.

The front end of the lens element 112a or a portion thereof may serve as the antenna aperture of the antenna assembly 110. The feed antenna 111 may be disposed at a predefined distance L behind a phase center 114 of the lens element 112a along a center axis of the lens element 112a (shown in the illustration of FIG. 3A as the horizontal line A). Herein, the expression 'a predefined distance L behind the phase center 114' refers to a spatial position that is further away from the antenna aperture than the phase center 114 such that the feed antenna 111 is offset from the phase center 114 by the predefined distance L in the direction of the center axis of the lens element 112a. To put it in yet other words, the feed antenna 111 may be arranged on a (conceptual) plane that is perpendicular to the center axis of the lens element 112a and that is offset by the distance L from the phase center 114 along the center axis of the lens element 112a.

Along the lines described in the foregoing, the feed antenna 111 may comprise e.g. an antenna arrangement including a single antenna element (that is applied for both TX and RX) or an antenna arrangement including two antenna elements (where one is applied for TX and the other one for RX). Considering an antenna arrangement including a single antenna element, in an example, the antenna arrangement may be disposed with respect to the lens element 112a such that the single antenna element is positioned at the center axis of the lens element 112a, whereas in another example the antenna arrangement may be disposed with respect to the lens element 112a such that the single antenna element is offset from the center axis of the lens element 112a. Considering an antenna arrangement including two antenna elements, in an example the antenna arrangement may be disposed with respect to the lens element 112a such that one of the two antenna elements is positioned at the center axis of the lens element 112a, whereas in another example the antenna arrangement may be disposed with respect to the lens element 112a such that both antenna elements are offset from the center axis of the lens element 112a.

Figure 3B:
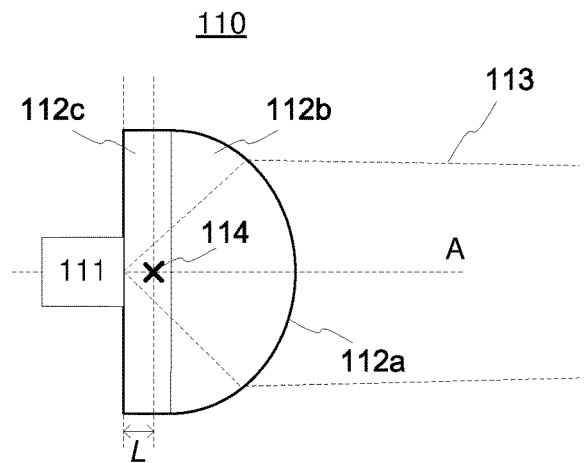
FIG. 3B schematically illustrates some aspects of an antenna assembly according to example.

While the example of FIG. 3A (also) serves to illustrate the concept of offsetting the position of the feed antenna 111 from the phase center of the lens element 112a, it may be also considered to represent an arrangement where there is an empty space (e.g. an air gap) between a back end of the lens element 112a and the feed antenna 111. FIG. 3B schematically illustrates a cross-sectional view to some elements of the antenna assembly 110 according to another example, where the lens element 112a, conceptually, comprises a front portion 112b (that corresponds to the lens element 112a of FIG. 3A) and a back portion 112c that fills the space between the feed antenna 111 and the front portion 112b such that the feed antenna 111 is offset from the phase center 114 by the distance L when positioned immediately against (the back end of) the back portion 112c. In other words, the back portion 112c may have a thickness that results in setting arranging the feed antenna 111 at the distance L from the phase center 114 when the feed antenna 111 is positioned immediately against the back portion 112c. The back portion 112c may have a substantially cylindrical shape and it may have a cross section that is substantially the same as the cross section of the back end of the front portion 112*b* (i.e. the side of the lens element 112*b* that opposite to its front end). The back portion 112*c* may be made of the same material as the front portion 112*b* and the front portion 112*b* and the back portion 112*c* may be provided as single-piece entity that serves as the lens element 112*a*.

The schematic illustrations of FIGS. 3A and 3B depict the lens element 112*a* as a plano-convex lens, whereas in various examples the lens element 112*a* may comprise a converging lens element of any type, e.g. a plano-convex lens or a biconvex lens. In an example, the lens element 112*a* comprises an axially symmetric lens, where the center axis of the lens element 112*a* also serves as its symmetry axis, whereas in another example the lens element 112*a* may comprise an axially asymmetric lens element.

While described above with references to the lens element 112*a* schematically illustrated in FIGS. 3A and 3B, the above description concerning the position of the feed antenna 111 with respect to the phase center 114 of the lens element 112*a* serving as the focusing element 112 applies also to a scenario where the focusing element 112 is provided as a reflector element, mutatis mutandis.

In this regard, positioning of the feed antenna 111 behind the phase center 114 of the focusing element 112 results in transmitting the transmitter beam 113 as one that consists of a sequence concave waves, while with a suitable selection of the distance L in view of respective characteristics of the transmitted RF signal, the feed antenna 111 and the focusing element 112 such positioning of the feed antenna 111 with respect to the focusing element 112 results in the transmitter beam 113 where the concave transmitted waves 113*a* have a desired extent of curvature. In this regard, increasing the distance L results in increased curvature of the concave waves 113*a* while, in contrast, decreasing the distance L results in decreased curvature of the concave waves 113*a*. Moreover, decreasing the distance L to zero (i.e. L=0) results transmission of plane waves instead concave waves 113*a* from the antenna assembly 110, thereby providing a performance that may be substantially similar to that obtainable via usage of the previously known approach outlined in the foregoing with references to FIGS. 1A and 1B. The distance L may be selected in dependence of the desired extent of curvature of concave transmitted waves 113*a* in view of the shape and dimensions of the focusing element 112. As an example in this regard, the distance L may be defined as a predefined portion of the diameter of the cross-section of the focusing element 112, e.g. as a predefined portion of the diameter of the (mechanical) antenna aperture, where the predefined portion may be a non-zero value chosen from a range from 0 to 10%, e.g. 3%. Hence, in case of using the lens element 112*a* of the examples of FIGS. 3A and 3B as the focusing element 112, this corresponds to a range from 0 to 10% (e.g. 3%) of the diameter of the substantially circular cross-section of lens element 112*a*.

In an example, the radar apparatus 100 may rely on frequency modulated continuous wave (FMCW) transmission and reception. As an example in this regard, the transmitter 120 and the receiver 130 may be implemented as a Doppler transceiver that is arranged to apply frequency modulated continuous wave (FMCW) transmission and reception, which may be referred to as a FMCW Doppler transceiver. In another example, instead of applying the FMCW approach, the radar apparatus 100 may rely on pulsed transmission (and reception) that involves alternating transmission periods for transmitting a series of concave waves 113*a* (i.e. a transmission pulse) and reception periods for receiving the corresponding backscattered waves 143*a*. In such an approach, the applied transmission period is preferably relatively short one since reception of backscattered waves 143*a* is substantially blocked during the transmission periods and hence usage of the relatively short transmission pulses allows for detecting and tracking (also) targets that reside within the near field.

While the antenna assembly 110 according to the present disclosure is applicable across the RF wavelengths, in a non-limiting example a carrier wavelength in a range from a fraction of one millimeter to a few tens of millimeters, e.g. 5 millimeters, may be applied. Such carrier wavelengths enable usage of RF bandwidths in a range of several hundred MHz or even in a range of a few GHz (depending on the applied carrier wavelength), which in turn enables a relatively high spatial resolution that may be advantageous, for example, in meteorological or atmospheric applications e.g. for detection of precipitation particles, cloud particles and/or other constituents of ambient air as well as for detection of other objects in radar environment.

Figure 1A:
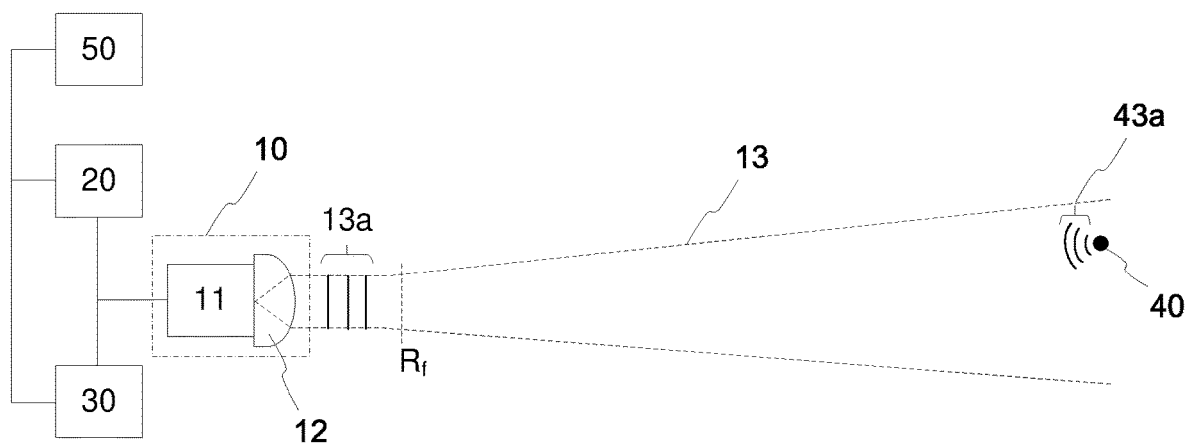
FIGS. 1A and 1B illustrate a block diagram of some components of a radar apparatus together with schematically illustrating some aspects of operation of the radar apparatus known in the art.
Figure 1B:
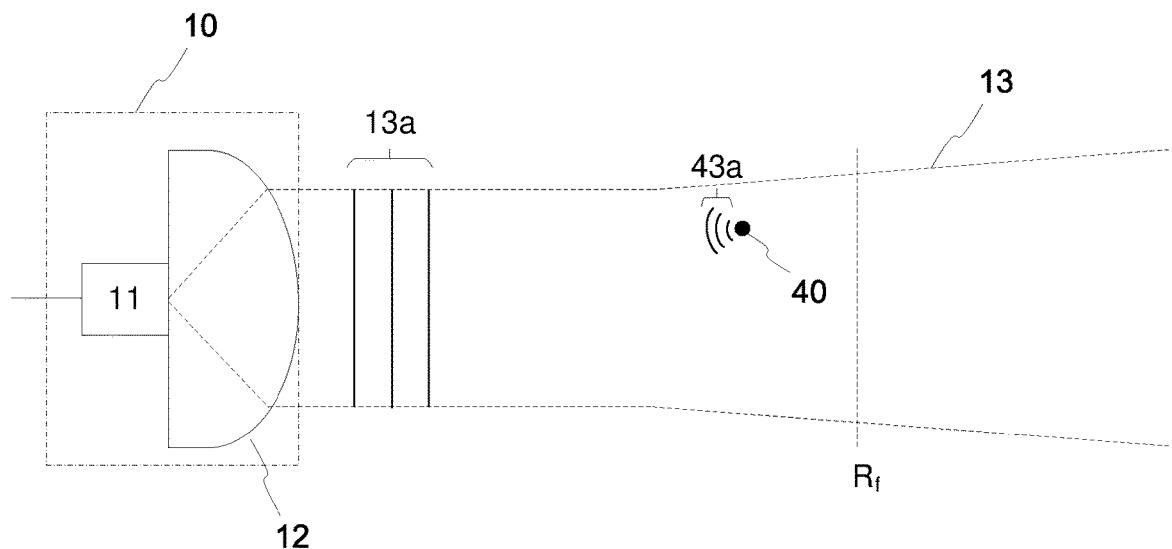
Figure 5:
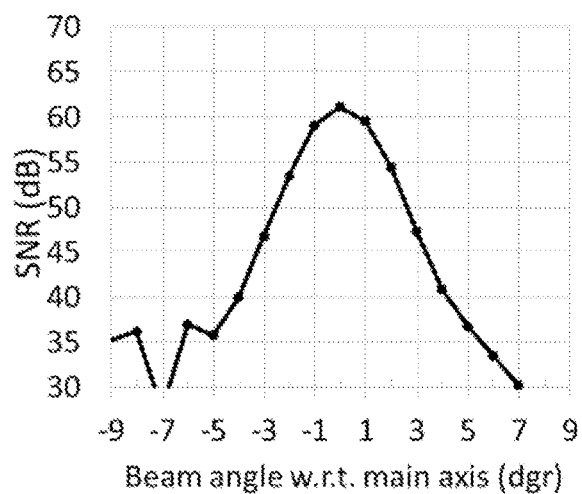
FIGS. 4 and 5 illustrate some aspects of operation and performance obtainable via usage of an antenna assembly according to an example.
Figure 5:
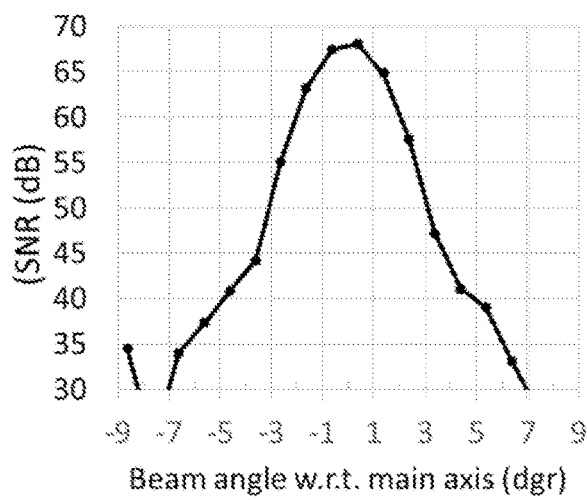
Figure 4:
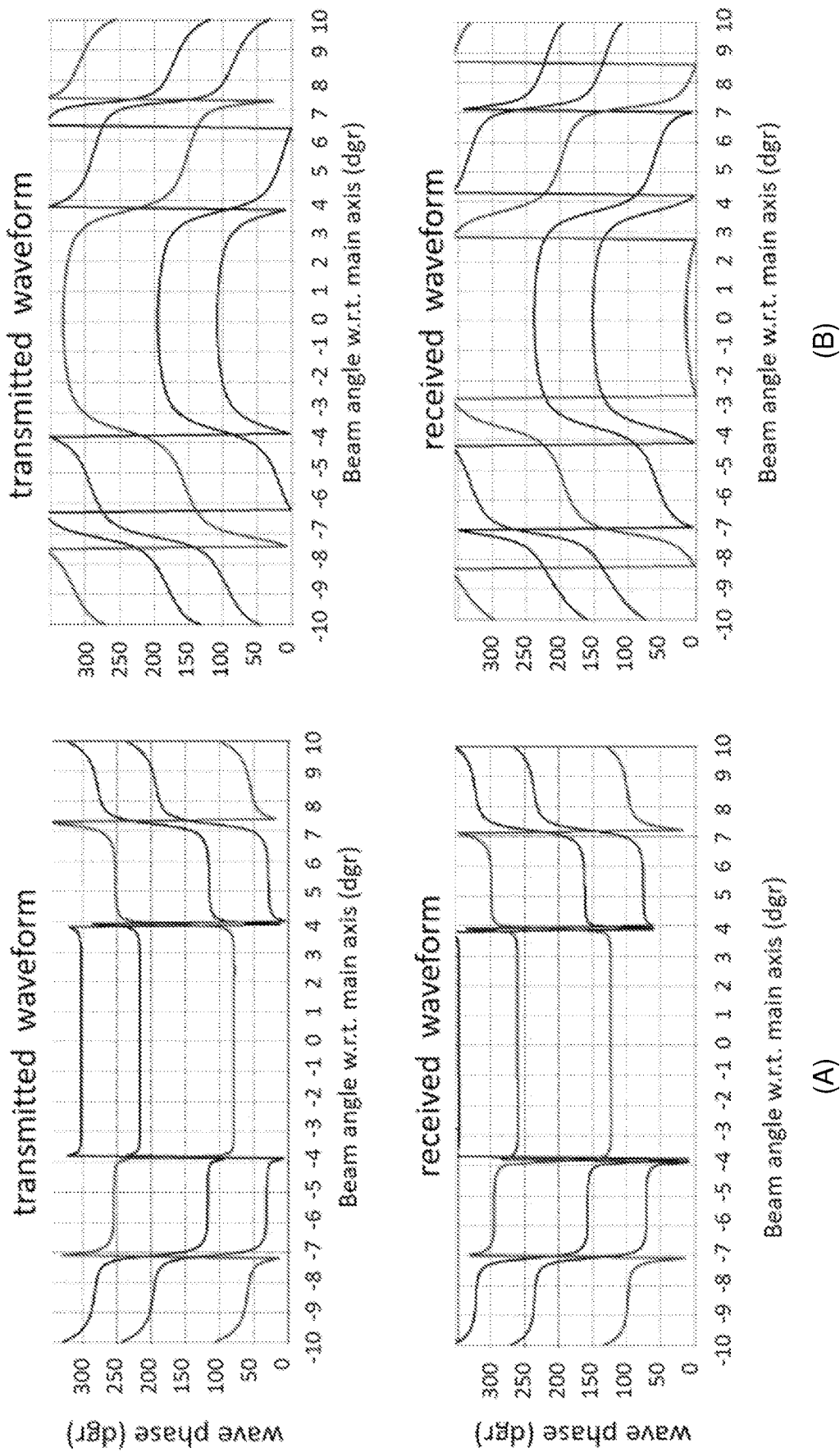

FIGS. 4 and 5 illustrate some aspects of operation and performance of the antenna assembly 110 according to the present disclosure in comparison to that of the antenna assembly 10 according to the previously known approach outlined in the foregoing with references to FIGS. 1A and 1B determined via modeling and measurements when measuring a target that is within the near field (e.g. within the Fresnel zone). In this regard, the illustration (A) of FIG. 4 depicts respective phase patterns of radio waves transmitted (the upper graph) and received (the lower graph) via usage of the antenna assembly 10 that represents previously known antenna arrangements, whereas the illustration (B) of FIG. 4 depicts respective phase patterns of radio waves transmitted (the upper graph) and received (the lower graph) using the antenna assembly 110 according to the present disclosure. In this regard, the phase patterns shown in the illustrations (A) are obtained via positioning the feed antenna 11 at the phase center of the lens element 11, whereas the phase patterns shown in the illustration (B) are obtained via arranging the feed antenna 111 at a position that is offset from the phase center 114 of the lens element 112 in the direction of the center axis of the lens element 112 by a distance that is approximately 3% of the cross section of the focusing element 112. As shown in the illustration (A), in case of the antenna assembly 10 the respective transmitted and received phase patterns are substantially planar in the main (or central) part of the transmitter beam 113 and the receiver beam, whereas in case of the antenna assembly 110 the transmitted and received phase patterns exhibit substantially concave shape in the main (or central) part of the transmitter beam 113 and receiver beam.

Further in this regard, FIG. 5 illustrates respective strengths of the received RF signal as a function of target direction for an exemplifying target at a certain distance within the near field obtainable via usage of the antenna assembly 10 and the antenna assembly 110 for a target within the near field (e.g. within the Fresnel zone): the illustration (A) of FIG. 5 depicts the signal-to-noise ratio (SNR) of the received RF signal as a function of target direction (expressed as an angle between the target direction and the center axis of the lens element 12) obtainable via usage of the antenna assembly 10, whereas the illustration (B) of FIG. 5 depicts the SNR of the received RF signal as a function of target direction (expressed as an angle between the target direction and the center axis of the lens element 112*a*) obtainable via usage of the antenna assembly 110. As shown in the respective illustrations (A) and (B), usage of the antenna assembly 110 provides approximately 6 dB improvement in the SNR (i.e. an improvement approximately by a factor of four) over the antenna assembly 10 within the main (e.g. central) part of the receiver beam, thereby suggesting a substantial advantage in detecting and/or tracking small targets in the near field (e.g. in the Fresnel zone). Moreover, the ratio of respective signal levels in the main (e.g. central) part of the receiver beam (e.g. in a main lobe) and the side parts of the receiver beam (e.g. side lobes) is significantly larger in the received RF signal obtainable via usage of the antenna assembly 110 than in the RF signal obtainable via usage of the antenna assembly 10, which likewise suggests a substantial advantage via increasing the margin between signal components backscattered from targets located in the monitoring direction of interest (represented by the main lobe) and the randomly backscattered signal components from targets located around the monitoring direction of interest (represented by the side lobes).

The radar apparatus 100 and the antenna assembly 110 described in the present disclosure enable improved sensitivity in detecting weak signals that represent respective small targets via enabling operation in short ranges including also distances that fall within the Fresnel zone: since the backscattered signals are strongly attenuated with increasing distance from the antenna assembly 110, the disclosed antenna design that enables measurements to be carried out (also) in the near field significantly improves the capability of detecting small targets of interest. By considering backscattered RF signals form shortest viable ranges including the Fresnel zone, the spectral features of the captured RF signal that represent echo from a plurality of targets can be determined at high accuracy, because the echo typically originates from a smaller number of targets, thereby enabling their more detailed and accurate analysis via operation of the processing unit 150, and the echo may be associated with a homogenous ensemble of targets due to close (spatial) proximity of the targets.

In meteorological applications this may enable detection of targets such as small constituents in the air, drizzle drops, fog droplets, large aerosol particles, etc. Moreover, while the transverse size of the transmitter beam 113 is anyway smallest in the near field, the concave waves 113a may result in further collimating the transmitter beam 113 within the near field (e.g. in the Fresnel zone). Consequently, a measurement volume within the near field is small in relation to that of the previously known solutions, which together with a relatively high spatial resolution enabled by the disclosed antenna assembly 110 is advantageous in simultaneous detection of multiple targets that may have varying characteristics e.g. in terms of their size and their velocity. Yet further, when optimizing or even limiting the measurement for the near field, clutter management becomes more straightforward in comparison to that of the previously known solutions.

In the foregoing, various characteristics and operation of the antenna assembly 110 together with advantages arising from its usage are described via references to operation and/or characteristics of the radar apparatus 100 making use of the antenna assembly 110. While usage in the radar apparatus 100 may constitute an important application scenario, the disclosed antenna assembly 110 is likewise applicable for other applications that involve transmission and reception of RF signals. In this regard, usage of the antenna assembly 110 may be generalized into a form of a method that comprises providing an antenna assembly 110 that comprises a feed antenna 111 arranged to radiate outbound radio waves that represent a transmitted RF signal supplied thereto and capture a received RF signal that represents inbound radio waves received thereat and the focusing element 112 arranged to collimate the outbound radio waves into the transmitter beam 113 for transmission towards a monitoring direction and focus inbound radio waves of the receiver beam received at the focusing element 112 from the monitoring direction for reception at the feed antenna 111; and operating the antenna assembly 110 to transmit the transmitter beam 113 as a sequence of substantially concave waves 113a and to receive the receiver beam as a sequence of substantially convex radio waves.

The above-described method may be implemented, varied and/or complemented in a number of ways, for example as described with references to the radar apparatus 100 and/or the antenna assembly 110 in the foregoing and/or in the following.

Figure 6:
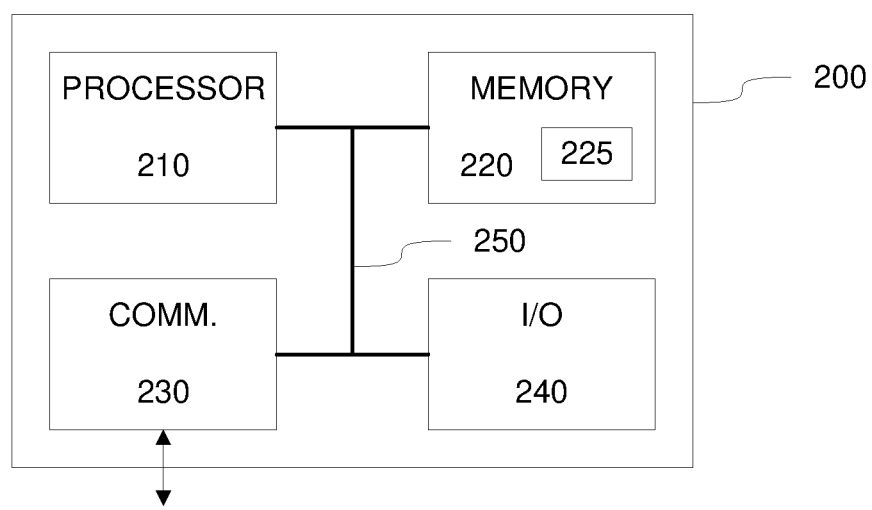
FIG. 6 illustrates a block diagram of some components of an apparatus according to an example.

FIG. 6 illustrates a block diagram of some components of an apparatus 200 that may be employed to implement operations described in the foregoing with references to the processing unit 150. The apparatus 200 comprises a processor 210 and a memory 220. The memory 220 may store data and computer program code 225. The apparatus 200 may further comprise communication means 230 for wired or wireless communication with other apparatuses. The communication means 230 may enable communication with apparatuses that are provided as part of the radar apparatus 100 and/or with apparatuses that are external to the radar apparatus 100. As an example of the former, the communication means 230 may enable communication with the transmitter 120 and/or with the receiver 130. The apparatus may further comprise user I/O (input/output) components 240 that may be arranged, together with the processor 210 and a portion of the computer program code 225, to provide the user interface for receiving input from a user and/or providing output to the user. In particular, the user I/O components may include user input means, such as one or more keys or buttons, a keyboard, a touchscreen or a touchpad, etc. The user I/O components may include output means, such as a display or a touchscreen. The components of the apparatus 200 are communicatively coupled to each other via a bus 250 that enables transfer of data and control information between the components.

The memory 220 and a portion of the computer program code 225 stored therein may be further arranged, with the processor 210, to cause the apparatus 200 to perform at least some aspects of operation of the processing unit 150 described in the foregoing. The processor 210 is configured to read from and write to the memory 220. Although the processor 210 is depicted as a respective single component, it may be implemented as respective one or more separate processing components. Similarly, although the memory 220 is depicted as a respective single component, it may be implemented as respective one or more separate components, some or all of which may be integrated/removable and/or may provide permanent/semi-permanent/dynamic/cached storage.

The computer program code 225 may comprise computer-executable instructions that implement at least some aspects of operation of the processing unit 150 described in the foregoing when loaded into the processor 210. As an example, the computer program code 225 may include a computer program consisting of one or more sequences of one or more instructions. The processor 210 is able to load and execute the computer program by reading the one or more sequences of one or more instructions included therein from the memory 220. The one or more sequences of one or more instructions may be configured to, when executed by the processor 210, cause the apparatus 200 to perform at least some aspects of operation of the processing unit 150 described in the foregoing. Hence, the apparatus 200 may comprise at least one processor 210 and at least one memory 220 including the computer program code 225 for one or more programs, the at least one memory 220 and the computer program code 225 configured to, with the at least one processor 210, cause the apparatus 200 to perform at least some aspects of operation of the processing unit 150 described in the foregoing.

The computer program code 225 may be provided e.g. a computer program product comprising at least one computer-readable non-transitory medium having the computer program code 225 stored thereon, which computer program code 225, when executed by the processor 210 causes the apparatus 200 to perform at least some aspects of operation of the processing unit 150 described in the foregoing. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Reference(s) to a processor herein should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described.

The invention claimed is:

1. A radar apparatus arranged for operation in meteorological and/or atmospheric studies to simultaneously detect and distinguish a plurality of targets at different distances from the radar apparatus, the apparatus comprising:
    an antenna assembly comprising:
        a feed antenna arranged to radiate outbound radio waves that represent a transmitted RF signal supplied thereto and capture a received RF signal that represents inbound radio waves received thereat; and
        a single focusing element positioned with respect to the feed antenna such that the feed antenna is disposed further away from an antenna aperture of the antenna assembly than a phase center of the focusing element and such that the feed antenna is positioned on a plane that is offset from the phase center by a predefined distance along a center axis of the focusing element, thereby arranged to collimate the outbound radio waves originating from the feed antenna into respective concave radio waves of a transmitter beam for transmission towards a monitoring direction and focus convex inbound radio waves of a receiver beam received at the focusing element from the monitoring direction for reception at the feed antenna;
    a transmitter arranged to supply the transmitted RF signal to the feed antenna and a receiver arranged to receive the received RF signal captured at the feed antenna; and
    a processing unit arranged to determine, based on the received RF signal in consideration of the transmitted RF signal, respective characteristics of the plurality of targets at different distances from the antenna assembly in the monitoring direction, wherein said characteristics include at least one of the following:
        respective locations of the plurality of targets,
        respective velocities of the plurality of targets,
        respective sizes of the plurality of targets,
        respective shapes of the plurality of targets.

2. The radar apparatus according to claim 1, wherein the arrangement of the feed antenna and the focusing element is configured for measurements at distances closer than the Fraunhofer limit defined as $$R_F = 2d^2/\lambda,$$

where d denotes a diameter of the antenna aperture of the antenna assembly and where $\lambda$ denotes carrier wavelength applied for the transmitted RF signal.

3. The radar apparatus according to claim 1, wherein the focusing element comprises a substantially axially symmetric element.

4. The radar apparatus according to claim 1, wherein the predefined distance is defined as a predefined non-zero portion of the diameter of the cross-section of the focusing element.

5. The radar apparatus according to claim 1, wherein the focusing element comprises one of the following:
    a lens element made of dielectric material arranged for refracting the outbound and inbound radio waves,
    a reflector element arranged for reflecting the outbound and inbound radio waves.

6. The radar apparatus according to claim 1, wherein the focusing element comprises a lens element made of dielectric material arranged for refracting the outbound and inbound radio waves, where the lens element has a substantially circular cross-section and a convex front end that has a substantially ellipsoidal shape, where the front end or a portion thereof serves as the antenna aperture of the antenna assembly.

7. The radar apparatus according to claim 6, wherein the feed antenna comprises a single antenna element arranged for transmission and reception and disposed on said plane at the center axis of the lens element.

8. The radar apparatus according to claim 6, wherein the feed antenna comprises a first antenna element arranged for transmission and a second antenna element arranged for reception, disposed on said plane such that at least one of the first and second antenna elements is offset from the center axis of the lens element.

9. The radar apparatus according to claim 1, wherein the transmitter and the receiver are arranged to apply one of the following:
    a frequency modulated continuous wave (FMCW) transmission and reception, or
    a pulsed transmission and reception.

10. The radar apparatus according to claim 9, wherein the transmitter and the receiver are provided as a Doppler transceiver arranged to apply the FMCW transmission and reception.

* * * * *